Patented Jan. 22, 1946

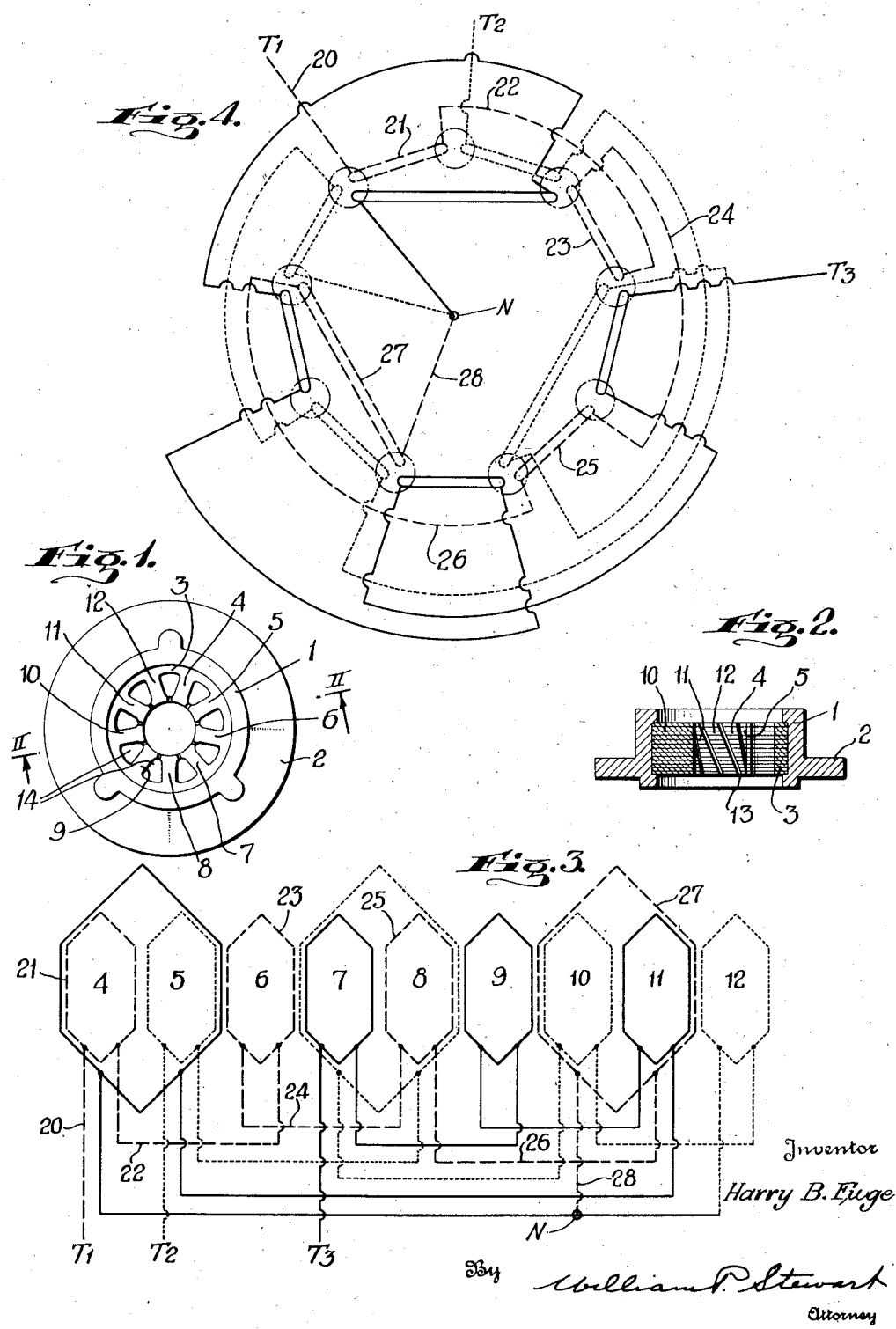

2,393,527

UNITED STATES PATENT OFFICE 2,393,527

ELECTRIC MOTOR

Harry B. Fuge, Somerville, N. J., assignor to The Singer Manufacturing Company, Elizabeth, N. J., a corporation of New Jersey Application June 1, 1944, Serial No. 538,289

5 Claims. (Cl. 171—206)

This invention relates to an electric motor and particularly to a nine slot, nine-tooth stator having a three-phase series star winding. The invention is particularly adapted for small motors such as are shown in full size in Figures 1 and 2 of the drawing, but it may be embodied with equal success in motors of other sizes.

It is an object of the invention to make a three-phase motor having a nine slot, nine-tooth stator with four poles. A difficulty arises in winding a stator of the type described to produce four poles, because of unbalanced fields, and a particular object of the invention is to overcome this difficulty. Other objects of the invention will be in part apparent and in part set forth hereinafter in the specification and claims.

The objects of the invention are accomplished generally speaking by making a motor which has a nine slot, nine-tooth stator wound in three-phases, each of which phases has one double tooth coil and three single tooth coils spaced from each other by a single intermediate tooth, the double coils of each phase being spaced from each other by 120°. It is a feature of my invention that I have devised windings for this stator which produce substantially balanced fields. The nature of these windings is set forth in detail hereinafter.

Fig. 1 is a plan view, in full size, of the motor casing and the stator, without windings.

Fig. 2 is a section on the line II—II of Fig. 1.

Fig. 3 is a diagrammatic view showing the relationship of the phase windings, the first phase being shown in dashed lines, the second phase being shown in dotted lines, and the third phase in solid lines.

Fig. 4 is a diagrammatic view showing the phase windings and their relationship to one another on the stator.

Among the numerals of the drawing, 1 is a casing; 2 is a flange on the casing; 3 is a laminated frame whose laminations are shown in Fig 2 and which frame is held within the casing 1; 4, 5, 6, 7, 8, 9, 10, 11, 12 are skewed teeth; 13 are slot openings connecting the rotor space to the slots 14 between the teeth.

In Fig. 3 is schematically shown the winding of the stator. In considering this figure it must be remembered that each hexagon represents a winding about a stator tooth, and that the numbers in the hexagons correspond to the numbers of the teeth in Figs. 1 and 2. T1 is the terminal of the first phase of the stator winding which is connected to the winding 21 about tooth 4 by the lead-in 20; 22 is the connection from the first winding to the next winding 23 of this phase, which is about tooth 6; 24 is the connection to the third winding 25 of this phase which is about tooth 8; 26 is the connection from the third to the fourth winding 27 of the first phase, which encloses teeth 10 and 11; and 28 is the lead out to the neutral point N of the series star winding.

The circular arrangement of the phase in which the coils are indicated by flat sided closed figures may be followed in Fig. 4, to which the same numbers are applied. Each of the phases may be followed in the same manner, the second phase by following the dotted line, and the third by following the solid line.

The winding with equal turns which surround the teeth produces unbalanced fields, so I have corrected this by varying the windings as follows:

| Phase | Windings on post No. | | | | | | | | |
|---|---|---|---|---|---|---|---|---|---|
|  | 4 | 5 | 6 | 7 | 8 | 9 | 10 | 11 | 12 |
| 1 | 99 |  | 77 |  | 99 |  | 49 |  | 77 |
| 2 |  | 99 |  | 49 |  | 99 |  | 77 |  |
| 3 | 49 |  |  |  | 99 |  | 77 |  | 99 |

It will be understood that the above is merely illustrative, and that if it is desired to vary the length of the stack, voltage, or other performance conditions, a different number of turns may be used, but the ratio of turns will remain the same.

It is thus seen that the pairs of teeth within the large coils are symmetrically placed with respect to each other and have windings thereupon bearing the turn ratios of 99, 99, and 49, respectively, and that the teeth intermediate the double windings are symmetrically placed and each having, relative to the other windings, a turn ratio of 77.

Certain obvious changes can be made in the stator, for instance, the slots need not be skewed, although to arrange them straight would introduce new problems in balance which can, however, be solved in accordance with the principles herein set forth.

As many apparently widely different embodiments of this invention may be made without departing from the spirit and scope thereof, it is to be understood that I do not limit myself to the specific embodiments thereof except as defined in the appended claims.

Having thus set forth the nature of the invention, what I claim herein is:

1. An alternating current motor having a circular laminated frame, with nine slots defining nine stator teeth, three-phase windings about said teeth forming poles, one of said phase windings having four coils with the adjacent coil sides equally spaced from each other, of which coils one encloses two stator teeth and the others each enclose a single stator tooth, the second of said phase windings being similarly wound 120 electrical degrees in advance, and the third of said phases being similarly wound 120 electrical degrees behind said first phase, the turns of wire about each of said teeth being proportioned to give, on the teeth which bear a double coil, turns in the ratio of 99, 99 and 49, respectively, and, on the teeth bearing only single coils, turns in the relative ratio of 77.

2. An alternating current motor having a circular laminated frame with nine slots defining nine teeth, three-phase windings about said teeth forming poles, one of said windings having four coils with the adjacent coil sides equally spaced from each other, one of which coils encloses two teeth and the others each enclose a single tooth, the second of said windings being similarly wound 120 electrical degrees in advance, and the third of said windings being similarly wound 120 electrical degrees behind said first winding, the turns of wire about each of said teeth being proportioned to give substantially balanced fields to the poles.

3. An alternating current motor having a circular laminated frame interiorly provided with nine slots defining nine teeth, three-phase windings about said teeth, one of said windings having four coils with adjacent coil sides equally spaced from each other, one of which coils encloses two teeth and the others each enclose a single tooth, the second of said phases being similarly wound 120 electrical degrees in advance and the third of said phases being similarly wound 120 electrical degrees behind said first phase, said winding being proportioned to give substantially balanced fields.

4. An alternating current motor having a circular frame and nine stator teeth, three-phase windings, each including one coil enclosing two teeth and one coil enclosing one tooth, the turns of wire about the teeth being proportioned to give balanced fields.

5. A three-phase, 400 cycle, four pole motor having a nine slot stator with certain coils of each phase winding having unequal turn ratios providing a balanced field.

HARRY B. FUGE